US012082327B2

(12) United States Patent
Kaufman et al.

(10) Patent No.: US 12,082,327 B2
(45) Date of Patent: Sep. 3, 2024

(54) ARTICLE FOR USE WITH APPARATUS FOR HEATING SMOKABLE MATERIAL

(71) Applicant: Nicoventures Trading Limited, London (GB)

(72) Inventors: Duane A. Kaufman, Hollandale, WI (US); Raymond Robey, Madison, WI (US); Benjamin J. Paprocki, Cottage Grove, WI (US); John A. Miller, Marshall, WI (US)

(73) Assignee: NICOVENTURES TRADING LIMITED, London (GB)

( * ) Notice: Subject to any disclaimer, the term of this patent is extended or adjusted under 35 U.S.C. 154(b) by 60 days.

(21) Appl. No.: 16/947,215

(22) Filed: Jul. 23, 2020

(65) Prior Publication Data

US 2020/0352237 A1 Nov. 12, 2020

Related U.S. Application Data

(63) Continuation of application No. 15/772,391, filed as application No. PCT/EP2016/075738 on Oct. 26,
(Continued)

(51) Int. Cl.
*H05B 6/10* (2006.01)
*A24F 40/42* (2020.01)
(Continued)

(52) U.S. Cl.
CPC ............. *H05B 6/105* (2013.01); *A24F 40/42* (2020.01); *A24F 40/465* (2020.01); *A24F 40/20* (2020.01)

(58) Field of Classification Search
CPC .... A24F 47/008; A24F 47/006; A24F 47/004; A24F 47/00; A24F 15/12; A24F 15/14;
(Continued)

(56) References Cited

U.S. PATENT DOCUMENTS 2,592,554 A 4/1952 Frankenburg
2,860,638 A 11/1958 Frank et al.
(Continued)

FOREIGN PATENT DOCUMENTS

AU 2014369867 A1 6/2016
AU 2017289114 B2 4/2020
(Continued)

OTHER PUBLICATIONS

Application and File History for U.S. Appl. No. 16/311,411, filed Dec. 19, 2018, inventors Abi Aoun et al.
(Continued)

*Primary Examiner* — Chris Q Liu
(74) *Attorney, Agent, or Firm* — Husch Blackwell

(57) ABSTRACT

Disclosed is an article for use with apparatus for heating smokable material to volatilize at least one component of the smokable material, the article including: a malleable container defining a cavity; a mass of smokable material in the cavity; and heating material that is heatable by penetration with a varying magnetic field to heat the smokable material. Also disclosed is a system including: such an apparatus; and an article for use with the apparatus, the article including a container defining a cavity, and a mass of smokable material in the cavity; wherein the apparatus includes a heating zone for receiving at least a portion of the article, and a magnetic field generator for generating a varying magnetic field to be used in heating the smokable material when the portion of the article is in the heating zone. In the system, the container is malleable, or a portion of the container is porous for permitting volatilised material generated by heating the smokable material within the cavity to leave the cavity.

14 Claims, 3 Drawing Sheets

Related U.S. Application Data

2016, now abandoned, which is a continuation-in-part of application No. 14/927,537, filed on Oct. 30, 2015, now abandoned.

(51) Int. Cl.
*A24F 40/465* (2020.01)
*A24F 40/20* (2020.01)

(58) Field of Classification Search
CPC ........ A24F 15/18; A24F 47/002; A24F 40/20; A24F 40/465; A24F 40/46; A24F 40/10; A24F 40/42; A24F 40/50; A24F 40/40; A24F 40/485; A24F 40/53; A24F 42/10; A24F 40/60; A24F 40/70; A24F 7/00; A24F 40/44; A24F 40/85; A24F 40/90; A24F 42/60; A24F 40/30; A24F 40/48; A24F 40/51; A24F 40/57; A24F 40/95; A24F 42/80; A24F 15/01; A24F 15/015; A24F 40/00; A24F 42/20; H05B 3/34; H05B 6/105; H05B 6/108; H05B 2203/003; H05B 3/145; H05B 3/42; H05B 1/0202; H05B 1/0236; H05B 1/0244; H05B 1/0297; H05B 2203/002; H05B 2203/013; H05B 2203/014; H05B 2203/021; H05B 2203/026; H05B 2203/032; H05B 2203/037; H05B 2214/04; H05B 3/0014; H05B 3/009; H05B 3/24; H05B 3/265; H05B 3/46; H05B 3/845; H05B 6/06; H05B 6/103; H05B 6/36; H05B 6/365; H05B 6/44; H05B 2203/017; H05B 2203/022; H05B 2203/011; H05B 2203/015; H05B 3/06; H05B 3/16; H05B 3/342; H05B 3/347; H05B 3/146; H05B 3/36; H05B 3/44; H05B 1/0291; H05B 2203/004; H05B 2203/016; H05B 2203/028; H05B 2214/02; H05B 3/12; H05B 3/141; H05B 3/286
USPC ....... 219/635, 628, 202, 214, 263, 520, 600, 219/634, 667, 535, 476, 213, 219, 528, 219/618, 629, 632, 655
See application file for complete search history.

(56) References Cited

U.S. PATENT DOCUMENTS 3,065,756 A 11/1962 Noel et al.
3,144,174 A 8/1964 Henry et al.
3,173,612 A 3/1965 Gut et al.
3,517,151 A 6/1970 Mekjean et al.
3,596,034 A 7/1971 Mekjean
4,149,548 A 4/1979 Bradshaw
4,913,168 A 4/1990 Potter et al.
4,944,317 A 7/1990 Thal
5,093,894 A 3/1992 Deevi et al.
5,144,962 A 9/1992 Counts et al.
5,317,132 A 5/1994 Clough et al.
5,369,249 A 11/1994 Kwon
5,613,505 A * 3/1997 Campbell .............. A24F 40/53 131/194
5,649,554 A 7/1997 Sprinkel et al.
6,053,176 A 4/2000 Adams et al.
6,632,407 B1 10/2003 Lau et al.
6,803,550 B2 10/2004 Sharpe et al.
7,185,659 B2 3/2007 Sharpe
7,185,959 B2 3/2007 Mueller et al.
7,810,505 B2 10/2010 Yang
8,459,271 B2 6/2013 Inagaki
8,807,140 B1 8/2014 Scatterday
8,910,640 B2 12/2014 Sears et al.
8,968,848 B2 3/2015 Quella et al.
9,357,803 B2 6/2016 Egoyants et al.
9,554,598 B2 1/2017 Egoyants et al.
9,710,921 B2 7/2017 Wong et al.
9,980,512 B2 5/2018 Collett et al.
10,058,123 B2 8/2018 Taluskie et al.
10,420,372 B2 9/2019 Suzuki et al.
10,524,508 B2 1/2020 Sur et al.
11,363,682 B2 6/2022 Mironov et al.
2002/0005207 A1 1/2002 Wrenn et al.
2002/0038799 A1 4/2002 Laken et al.
2002/0038800 A1 4/2002 Laken et al.
2002/0078951 A1 6/2002 Nichols et al.
2002/0078956 A1 6/2002 Sharpe et al.
2003/0007887 A1 1/2003 Roumpos et al.
2003/0102304 A1 6/2003 Boyers
2003/0230567 A1 12/2003 Centanni et al.
2004/0149297 A1 8/2004 Sharpe
2004/0188418 A1 9/2004 Aisenbrey
2005/0025213 A1 2/2005 Parks
2005/0045193 A1 3/2005 Yang
2007/0267409 A1 11/2007 Gard et al.
2009/0120928 A1 5/2009 Lee et al.
2009/0151717 A1 6/2009 Bowen et al.
2009/0293888 A1 12/2009 Williams et al.
2010/0024834 A1* 2/2010 Oglesby .................. A24F 42/60 131/194
2010/0181387 A1 7/2010 Zaffaroni et al.
2011/0240022 A1 10/2011 Hodges et al.
2011/0271971 A1 11/2011 Conner et al.
2012/0145703 A1 6/2012 Matsen et al.
2012/0214926 A1 8/2012 Berthold et al.
2012/0234315 A1 9/2012 Li et al.
2012/0305545 A1 12/2012 Brosnan et al.
2013/0030125 A1 1/2013 Buryak et al.
2013/0133675 A1 5/2013 Shinozaki et al.
2013/0160780 A1 6/2013 Matsumoto et al.
2014/0060554 A1 3/2014 Collett et al.
2014/0096782 A1 4/2014 Ampolini et al.
2014/0158144 A1 6/2014 Kaljura et al.
2014/0216485 A1 8/2014 Egoyants et al.
2014/0224267 A1 8/2014 Levitz et al.
2014/0301721 A1 10/2014 Ruscio et al.
2015/0040925 A1 2/2015 Saleem et al.
2015/0043123 A1 2/2015 Cox
2015/0181937 A1 7/2015 Dubief et al.
2015/0201670 A1 7/2015 Crooks et al.
2015/0201675 A1 7/2015 Lord
2015/0237913 A1 8/2015 Suzuki et al.
2015/0245669 A1 9/2015 Cadieux et al.
2015/0260047 A1 9/2015 Gieras et al.
2015/0272219 A1 10/2015 Hatrick et al.
2015/0335062 A1 11/2015 Shinkawa et al.
2016/0007652 A1 1/2016 Taluskie et al.
2016/0012022 A1 1/2016 Lim
2016/0120221 A1 5/2016 Mironov et al.
2016/0150825 A1 6/2016 Mironov et al.
2016/0192708 A1 7/2016 DeMeritt et al.
2016/0324215 A1 11/2016 Mironov et al.
2016/0331031 A1 11/2016 Malgat et al.
2017/0055574 A1 3/2017 Kaufman et al.
2017/0055575 A1 3/2017 Wilke et al.
2017/0055580 A1 3/2017 Blandino et al.
2017/0055581 A1 3/2017 Wilke et al.
2017/0055582 A1 3/2017 Blandino et al.
2017/0055583 A1 3/2017 Blandino et al.
2017/0055584 A1 3/2017 Blandino et al.
2017/0055585 A1 3/2017 Fursa et al.
2017/0071250 A1 3/2017 Mironov et al.
2017/0095006 A1 4/2017 Egoyants et al.
2017/0119046 A1 5/2017 Kaufman et al.
2017/0119047 A1 5/2017 Blandino et al.
2017/0119048 A1 5/2017 Kaufman et al.
2017/0119049 A1 5/2017 Blandino et al.
2017/0119050 A1 5/2017 Blandino et al.
2017/0119051 A1 5/2017 Blandino et al.
2017/0156403 A1 6/2017 Gill et al.

(56) References Cited

U.S. PATENT DOCUMENTS

| | | | |
|---|---|---|---|
| 2017/0174418 | A1 | 6/2017 | Cai |
| 2017/0199048 | A1 | 7/2017 | Igumnov et al. |
| 2017/0224015 | A1 | 8/2017 | Basil et al. |
| 2017/0251718 | A1 | 9/2017 | Armoush et al. |
| 2017/0325506 | A1 | 11/2017 | Batista |
| 2018/0228217 | A1 | 8/2018 | Mironov et al. |
| 2018/0235279 | A1 | 8/2018 | Wilke et al. |
| 2018/0242633 | A1 | 8/2018 | Wilke et al. |
| 2018/0242636 | A1 | 8/2018 | Blandino et al. |
| 2018/0279677 | A1 | 10/2018 | Blandino et al. |
| 2018/0317552 | A1 | 11/2018 | Kaufman et al. |
| 2018/0317553 | A1 | 11/2018 | Blandino et al. |
| 2018/0317555 | A1 | 11/2018 | Blandino et al. |
| 2018/0325173 | A1 | 11/2018 | Blandino et al. |
| 2018/0360123 | A1 | 12/2018 | Silvestrini |
| 2019/0159517 | A1 | 5/2019 | Ballesteros Gomez et al. |
| 2019/0191780 | A1 | 6/2019 | Wilke et al. |
| 2019/0230988 | A1 | 8/2019 | Aoun |
| 2019/0239555 | A1 | 8/2019 | Nicholson |
| 2020/0054068 | A1 | 2/2020 | Blandino et al. |
| 2020/0054069 | A1 | 2/2020 | Blandino et al. |
| 2020/0229497 | A1 | 7/2020 | Aoun et al. |
| 2020/0268053 | A1 | 8/2020 | Thorsen et al. |
| 2020/0288774 | A1 | 9/2020 | Blandino et al. |
| 2021/0100281 | A1 | 4/2021 | Abi Aoun et al. |
| 2022/0015408 | A1 | 1/2022 | Blandino et al. |

FOREIGN PATENT DOCUMENTS

| | | | |
|---|---|---|---|
| CA | 2003521 | A1 | 5/1990 |
| CA | 2003522 | A1 | 5/1990 |
| CA | 2937722 | A1 | 11/2015 |
| CA | 2974770 | A1 | 12/2015 |
| CA | 2982164 | A1 | 10/2016 |
| CA | 3002424 | A1 | 4/2017 |
| CN | 1126426 | A | 7/1996 |
| CN | 2393205 | Y | 8/2000 |
| CN | 2738167 | Y | 11/2005 |
| CN | 2924411 | Y | 7/2007 |
| CN | 101084801 | A | 12/2007 |
| CN | 201076006 | Y | 6/2008 |
| CN | 201088138 | Y | 7/2008 |
| CN | 101277623 | A | 10/2008 |
| CN | 101326138 | A | 12/2008 |
| CN | 101390659 | A | 3/2009 |
| CN | 201199922 | Y | 3/2009 |
| CN | 101951796 | A | 1/2011 |
| CN | 201762288 | U | 3/2011 |
| CN | 101326138 | B | 1/2013 |
| CN | 103202540 | A | 7/2013 |
| CN | 203369386 | U | 1/2014 |
| CN | 203435685 | U | 2/2014 |
| CN | 103689812 | A | 4/2014 |
| CN | 203735483 | U | 7/2014 |
| CN | 103988576 | A | 8/2014 |
| CN | 203748687 | U | 8/2014 |
| CN | 203762288 | U | 8/2014 |
| CN | 104013109 | A | 9/2014 |
| CN | 104095291 | A | 10/2014 |
| CN | 104256899 | A | 1/2015 |
| CN | 204091003 | U | 1/2015 |
| CN | 104365175 | A | 2/2015 |
| CN | 104470387 | A | 3/2015 |
| CN | 104480800 | A | 4/2015 |
| CN | 104619202 | A | 5/2015 |
| CN | 104664608 | A | 6/2015 |
| CN | 104768407 | A | 7/2015 |
| CN | 204519366 | U | 8/2015 |
| CN | 204539505 | U | 8/2015 |
| CN | 204599333 | U | 9/2015 |
| CN | 104994757 | A | 10/2015 |
| CN | 105188425 | A | 12/2015 |
| CN | 105682488 | A | 6/2016 |
| CN | 104095291 | B | 1/2017 |
| EA | 009116 | B1 | 10/2007 |
| EP | 0430559 | A2 | 6/1991 |
| EP | 0430566 | A2 | 6/1991 |
| EP | 0488488 | A1 | 6/1992 |
| EP | 0703735 | A1 | 4/1996 |
| EP | 0703735 | B1 | 7/2001 |
| EP | 1357025 | A2 | 10/2003 |
| EP | 1454840 | A1 | 9/2004 |
| EP | 1454840 | B1 | 9/2006 |
| EP | 1940254 | A2 | 7/2008 |
| EP | 2059091 | A2 | 5/2009 |
| EP | 1357025 | B1 | 7/2009 |
| EP | 2186833 | A1 | 5/2010 |
| EP | 2316286 | A1 | 5/2011 |
| EP | 2327318 | A1 | 6/2011 |
| EP | 2444112 | A1 | 4/2012 |
| EP | 2253541 | B1 | 5/2012 |
| EP | 2460424 | A1 | 6/2012 |
| EP | 2903552 | A1 | 8/2015 |
| EP | 2907397 | A1 | 8/2015 |
| EP | 3367823 | A2 | 9/2018 |
| EP | 3542747 | A1 | 9/2019 |
| EP | 3632244 | A1 | 4/2020 |
| GB | 347650 | A | 4/1931 |
| GB | 2495923 | A | 5/2013 |
| GB | 2504732 | A | 2/2014 |
| GB | 2504733 | A | 2/2014 |
| JP | S457120 | Y1 | 4/1970 |
| JP | H03113366 | A | 5/1991 |
| JP | H0556298 | U | 7/1993 |
| JP | H07502188 | A | 3/1995 |
| JP | H0850422 | A | 2/1996 |
| JP | H0851175 | A | 2/1996 |
| JP | H08511175 | A | 11/1996 |
| JP | H09509845 | A | 10/1997 |
| JP | 2001174054 | A | 6/2001 |
| JP | 2002043047 | A | 2/2002 |
| JP | 2002144451 | A | 5/2002 |
| JP | 2002252078 | A | 9/2002 |
| JP | 2004121594 | A | 4/2004 |
| JP | 3588469 | B2 | 11/2004 |
| JP | 2004331191 | A | 11/2004 |
| JP | 2008050422 | A | 3/2008 |
| JP | 2008511175 | A | 4/2008 |
| JP | 2009087703 | A | 4/2009 |
| JP | 2010022754 | A | 2/2010 |
| JP | 2010050834 | A | 3/2010 |
| JP | 2010508034 | A | 3/2010 |
| JP | WO2010113702 | A1 | 10/2012 |
| JP | 2013013441 | A | 1/2013 |
| JP | 2013515465 | A | 5/2013 |
| JP | 2015524261 | A | 8/2015 |
| JP | 2015531601 | A | 11/2015 |
| JP | 2016508744 | A | 3/2016 |
| JP | 2016516402 | A | 6/2016 |
| JP | 2016538842 | A | 12/2016 |
| JP | 6077145 | B2 | 2/2017 |
| JP | 2017515490 | A | 6/2017 |
| JP | 2017526381 | A | 9/2017 |
| JP | 2020512487 | A | 4/2020 |
| JP | 6875044 | B2 | 5/2021 |
| JP | 6933323 | B2 | 9/2021 |
| JP | 7105289 | B2 | 7/2022 |
| KR | 880701636 | A | 11/1988 |
| KR | 100385395 | B1 | 8/2003 |
| KR | 100449444 | B1 | 8/2005 |
| KR | 20100108565 | A | 10/2010 |
| KR | 20130029697 | A | 3/2013 |
| KR | 20140093659 | A | 7/2014 |
| KR | 20150027069 | A | 3/2015 |
| KR | 20150040012 | A | 4/2015 |
| KR | 20150047616 | A | 5/2015 |
| KR | 20150132112 | A | 11/2015 |
| KR | 20150143877 | A | 12/2015 |
| KR | 20160064159 | A | 6/2016 |
| KR | 20170008209 | A | 1/2017 |
| RU | 2132629 | C1 | 7/1999 |
| RU | 2135054 | C1 | 8/1999 |
| RU | 103281 | U1 | 4/2011 |
| RU | 2425608 | C2 | 8/2011 |

(56) References Cited

FOREIGN PATENT DOCUMENTS

| | | | |
|---|---|---|---|
| RU | 2509516 | C2 | 3/2014 |
| RU | 2531890 | C2 | 10/2014 |
| RU | 2015106592 | A | 11/2016 |
| RU | 2682772 | C1 | 3/2019 |
| UA | 125609 | C2 | 5/2022 |
| WO | WO-8404698 | A1 | 12/1984 |
| WO | WO-9409842 | A1 | 5/1994 |
| WO | WO-9527411 | A1 | 10/1995 |
| WO | WO-9527412 | A1 | 10/1995 |
| WO | WO-9618662 | A1 | 6/1996 |
| WO | WO-02089532 | A1 | 11/2002 |
| WO | WO-02098389 | A1 | 12/2002 |
| WO | WO-2007051163 | A2 | 5/2007 |
| WO | WO-2008015441 | A1 | 2/2008 |
| WO | WO-2009079641 | A2 | 6/2009 |
| WO | WO-2010133342 | A1 | 11/2010 |
| WO | WO-2011130414 | A1 | 10/2011 |
| WO | WO-2012134117 | A2 | 10/2012 |
| WO | WO-2012164009 | A2 | 12/2012 |
| WO | WO-2013034459 | A1 | 3/2013 |
| WO | WO-2013098395 | A1 | 7/2013 |
| WO | WO-2013098409 | A1 | 7/2013 |
| WO | WO-2013131763 | A1 | 9/2013 |
| WO | WO-2013131764 | A1 | 9/2013 |
| WO | WO-2013144324 | A1 | 10/2013 |
| WO | WO-2013178766 | A1 | 12/2013 |
| WO | WO-2014023965 | A1 | 2/2014 |
| WO | WO-2014023967 | A1 | 2/2014 |
| WO | WO-2014048745 | A1 | 4/2014 |
| WO | WO-2014054035 | A1 | 4/2014 |
| WO | WO-2014061477 | A1 | 4/2014 |
| WO | WO-2014102092 | A1 | 7/2014 |
| WO | WO-2014104078 | A1 | 7/2014 |
| WO | WO-2014139611 | A1 | 9/2014 |
| WO | WO-2014140320 | A1 | 9/2014 |
| WO | WO-2015019101 | A1 | 2/2015 |
| WO | WO-2015062983 | A2 | 5/2015 |
| WO | WO-2015071682 | A1 | 5/2015 |
| WO | WO-2015082648 | A1 | 6/2015 |
| WO | WO-2015082649 | A1 | 6/2015 |
| WO | WO-2015082651 | A1 | 6/2015 |
| WO | WO-2015082652 | A1 | 6/2015 |
| WO | WO-2015082653 | A1 | 6/2015 |
| WO | WO-2015100361 | A1 | 7/2015 |
| WO | WO-2015101479 | A1 | 7/2015 |
| WO | 2015117701 | A1 | 8/2015 |
| WO | WO-2015116934 | A1 | 8/2015 |
| WO | WO-2015117702 | A1 | 8/2015 |
| WO | WO-2015131058 | A1 | 9/2015 |
| WO | WO-2015155289 | A1 | 10/2015 |
| WO | WO-2015166245 | A2 | 11/2015 |
| WO | WO-2015175568 | A1 | 11/2015 |
| WO | WO-2015176898 | A1 | 11/2015 |
| WO | WO-2015177043 | A1 | 11/2015 |
| WO | WO-2015177044 | A1 | 11/2015 |
| WO | WO-2015177045 | A1 | 11/2015 |
| WO | WO-2015177046 | A1 | 11/2015 |
| WO | WO-2015177247 | A1 | 11/2015 |
| WO | WO-2015177253 | A1 | 11/2015 |
| WO | WO-2015177255 | A1 | 11/2015 |
| WO | WO-2015177257 | A1 | 11/2015 |
| WO | WO-2015177264 | A1 | 11/2015 |
| WO | WO-2015177294 | A1 | 11/2015 |
| WO | 2015197863 | A1 | 12/2015 |
| WO | WO-2015198015 | A1 | 12/2015 |
| WO | WO-2016023965 | A1 | 2/2016 |
| WO | WO-2016075426 | A1 | 5/2016 |
| WO | WO-2016075436 | A1 | 5/2016 |
| WO | 2016088037 | A1 | 6/2016 |
| WO | WO-2016096865 | A2 | 6/2016 |
| WO | WO-2016162446 | A1 | 10/2016 |
| WO | WO-2016207407 | A1 | 12/2016 |
| WO | WO-2017005705 | A1 | 1/2017 |
| WO | WO-2017029269 | A1 | 2/2017 |
| WO | WO-2017036950 | A2 | 3/2017 |
| WO | WO-2017036951 | A1 | 3/2017 |
| WO | WO-2017036954 | A1 | 3/2017 |
| WO | WO-2017036955 | A2 | 3/2017 |
| WO | WO-2017036957 | A1 | 3/2017 |
| WO | WO-2017036958 | A2 | 3/2017 |
| WO | WO-2017036959 | A1 | 3/2017 |
| WO | WO-2017036958 | A3 | 4/2017 |
| WO | WO-2017068098 | A1 | 4/2017 |
| WO | WO-2017072145 | A1 | 5/2017 |
| WO | WO-2017072146 | A1 | 5/2017 |
| WO | WO-2017072147 | A2 | 5/2017 |
| WO | WO-2017072148 | A1 | 5/2017 |
| WO | WO-2017072147 | A3 | 7/2017 |
| WO | WO-2017167932 | A1 | 10/2017 |

OTHER PUBLICATIONS

Application and File History for U.S. Appl. No. 16/311,418, filed Dec. 19, 2018, inventors Abi Aoun et al.

Application and File History for U.S. Appl. No. 14/840,897, filed Aug. 31, 2015, inventors Kaufman et al.

Application and File History for U.S. Appl. No. 16/946,043, filed Jun. 3, 2020, inventors Blandino et al.

Application and File History for U.S. Appl. No. 14/927,529, filed Oct. 30, 2015, inventors Kaufman et al.

Application and File History for U.S. Appl. No. 14/927,532, filed Oct. 30, 2015, inventors Blandino et al.

Application and File History for U.S. Appl. No. 14/927,537, filed Oct. 30, 2015, inventors Kaufman et al.

Application and File History for U.S. Appl. No. 14/927,539, filed Oct. 30, 2015, inventors Blandino et al.

Application and File History for U.S. Appl. No. 14/927,551, filed Oct. 30, 2015, inventors Blandino et al.

Application and File History for U.S. Appl. No. 14/927,556, filed Oct. 30, 2015, inventors Blandino et al.

Application and File History for U.S. Appl. No. 15/754,834, filed Feb. 23, 2018, inventor Thomas P. Blandino.

Application and File History for U.S. Appl. No. 15/772,391, filed Apr. 30, 2018, inventor Duane A Kaufman.

Application and File History for U.S. Appl. No. 15/772,396, filed Apr. 30, 2018, inventor Thomas P. Blandino.

Application and File History for U.S. Appl. No. 15/772,399, filed Apr. 30, 2018, inventor Thomas P. Blandino.

Application and File History for U.S. Appl. No. 15/733,194, filed Jun. 8, 2020, inventors Abi Aoun et al.

Application and File History for U.S. Appl. No. 15/772,394, filed Apr. 30, 2018, inventors Blandino et al.

Application and File History for U.S. Appl. No. 16/311,405, filed Dec. 19, 2018, inventors Abi Aoun et al.

Application and File History for U.S. Appl. No. 16/647,325, filed Mar. 13, 2020, inventors Thorsen et al.

Communication pursuant to Article 94(3) EPC for Application No. 16798648.8, mailed on Nov. 19, 2020, 9 pages.

Communication pursuant to Article 94(3) EPC for Application No. 16798649.6, mailed on Jul. 5, 2021, 7 pages.

Communication pursuant to Article 94(3) EPC for Application No. 17740628.7 mailed on May 9, 2022, 9 pages.

Communication pursuant to Article 94(3) EPC for Application No. 21213373.0 mailed on May 9, 2022, 6 pages.

Decision to Grant a Patent mailed Mar. 15, 2022 for Japanese Application No. 2020-183062, 5 pages.

English Translation of Chinese Office Action, Application No. 2016800490915, mailed Aug. 14, 2020, 8 pages.

European Search Report for Application No. 21213373.0, mailed on Apr. 26, 2022, 7 pages.

European Search Report for European Application No. 20205063.9, mailed on Feb. 18, 2021, 13 pages.

Examination Report for Australian Application No. 2016313708, mailed on Nov. 1, 2019, 7 pages.

Examination Report for Australian Application No. 2016313708, mailed on Nov. 23, 2018, 6 pages.

Examination Report mailed Sep. 6, 2019 for Australian Application No. 2017289114, 7 pages.

(56) References Cited

OTHER PUBLICATIONS

Examination Report No. 1 for Australian Patent Application No. 2018334042 dated Dec. 16, 2020, 4 pages.
Extended European Search Report for Application No. 20202666.2, mailed on Feb. 19, 2021, 14 pages.
Extended European Search Report for Application No. 20204770.0, mailed on Jun. 30, 2021, 14 pages.
Extended European Search Report for Application No. 20205060.5, mailed on Mar. 2, 2021, 19 pages.
Extended European Search Report for Application No. 20205060.5, mailed on Aug. 6, 2021, 20 pages.
Extended European Search Report for Application No. 20205065.4, mailed on Mar. 10, 2021, 14 pages.
Extended European Search Report for Application No. EP20205306.2, mailed on Feb. 19, 2021, 12 pages.
First Office Action and Search Report dated Mar. 4, 2020 for Chinese Application No. 201680077608.1 filed Oct. 26, 2016, 18 pages.
International Preliminary Report on Patentability for Application No. PCT/EP2016/075735, mailed on Jan. 2, 2018, 8 pages.
International Preliminary Report on Patentability for Application No. PCT/EP2016/075737, mailed on May 11, 2018, 10 pages.
International Preliminary Report on Patentability for Application No. PCT/EP2016/075738, mailed on May 11, 2018, 9 pages.
International Preliminary Report on Patentability for Application No. PCT/EP2017/065906, mailed on Jan. 10, 2019, 9 pages.
International Preliminary Report on Patentability for Application No. PCT/EP2017/065908, mailed on Jan. 10, 2019, 9 pages.
International Preliminary Report on Patentability for Application No. PCT/EP2018/075093, mailed on Mar. 26, 2020, 8 pages.
International Preliminary Report on Patentability for Application No. PCT/EP2016/070190, mailed on Mar. 15, 2018, 12 pages.
International Preliminary Report on Patentability for Application No. PCT/EP2016/075736, mailed on May 11, 2018, 6 pages.
International Preliminary Report on Patentability for Application No. PCT/EP2017/065909,mailed on Jan. 10, 2019, 7 pages.
International Search Report and Written Opinion for Application No. PCT/EP2016/070190, mailed on Mar. 13, 2017, 19 pages.
International Search Report and Written Opinion for Application No. PCT/EP2016/075735, mailed on Feb. 2, 2017, 10 pages.
International Search Report and Written Opinion for Application No. PCT/EP2016/075736, mailed on Feb. 14, 2017, 6 pages.
International Search Report and Written Opinion for Application No. PCT/EP2016/075737, mailed on Jun. 16, 2017, 14 pages.
International Search Report and Written Opinion for Application No. PCT/EP2016/075738, mailed on Mar. 2, 2017, 12 pages.
International Search Report and Written Opinion for Application No. PCT/EP2017/065906, mailed on Oct. 24, 2017, 16 pages.
International Search Report and Written Opinion for Application No. PCT/EP2017/065908, mailed on Oct. 17, 2017, 11 pages.
International Search Report and Written Opinion for Application No. PCT/EP2017/065909, mailed on Oct. 24, 2017, 10 pages.
International Search Report and Written Opinion for Application No. PCT/EP2018/058195, mailed on Nov. 12, 2018, 20 pages.
International Search Report and Written Opinion for Application No. PCT/EP2018/075093, mailed on Jan. 4, 2019, 11 pages.
International Search Report for Application No. PCT/EP2018/083795, mailed Mar. 15, 2019, 3 pages.
Iorga A., et al., "Low Curie Temperature in Fe—Cr—Ni—Mn Alloys," U.P.B. Sci.Bull., Series B, vol. 73 (4), 2011, pp. 195-202.
Neomax Materials Co., Ltd., "NeoMax MS-135," retrieved from http://www.neomax-materials.co.jp/eng/pr0510.htm, as accessed on Oct. 30, 2015, 2 pages.
Notice of Opposition mailed Jun. 3, 2020 for European Application No. 16766494.5, 37 pages.
Notice of Reasons for Refusal for Japanese Application No. 2020-528003, mailed on Jul. 20, 2021, 3 pages.
Notice of Reasons for Refusal Office Action mailed Sep. 8, 2020 for Japanese Application No. 2018-567856, 8 pages.
Notice of Reasons for Rejection Office Action mailed Mar. 17, 2020 for Japanese Application No. 2018-522061, 7 pages.
Notification of Reason for Refusal mailed Jan. 3, 2022 for Korean Application No. 10-2020-7018918, 12 pages.
Office Action and Search Report for Chinese Application No. 201880059756, mailed Jan. 14, 2022, 11 pages.
Office Action and Search Report for Russian Application No. 2020134245, mailed on Jan. 19, 2022, 27 pages.
Office Action and Search Report mailed Apr. 14, 2020 for Chinese Application No. 201680063711.0, 28 pages.
Office Action and Search Report mailed Jan. 18, 2022 for Russian Application No. 2020134241, 22 pages.
Office Action dated Jun. 1, 2021, for Russian Application No. 2020135859, 12 pages.
Office Action dated Jun. 17, 2021 for Ukraine Application No. 201804590, 3 pages.
Office Action dated Jun. 25, 2019 for Japanese Application No. 2018-521546, 4 pages.
Office Action for Brazilian Application No. 112018077348-4, mailed on Sep. 27, 2021, 4 pages.
Office Action for Canadian Application No. 3,003,519, mailed on Jul. 30, 2021, 4 pages.
Office Action for Canadian Application No. 3,056,677, mailed on Nov. 24, 2020, 6 pages.
Office Action for Chinese Application No. 201680072882. X, mailed on Sep. 1, 2021, 17 pages.
Office Action for Chinese Application No. 201680072882.X, mailed on Jan. 14, 2021, 12 pages.
Office Action for Chinese Application No. 201780039879.2 mailed on Sep. 18, 2020, 7 pages.
Office Action for Chinese Application No. 201780040300.4, mailed on Nov. 15, 2021, 14 pages.
Office Action for Japanese Application No. 2020-093539, mailed on Apr. 6, 2021, 6 pages.
Office Action for Japanese Application No. 2020-175420, mailed on Oct. 12, 2021, 9 pages.
Office Action for Japanese Application No. 2020-182740, mailed on Oct. 12, 2021, 10 pages.
Office Action for Japanese Application No. 2020-182750, mailed on Oct. 12, 2021, 8 pages.
Office Action for Japanese Application No. 2020-183062, mailed on Nov. 30, 2021, 6 pages.
Office Action for Japanese Application No. 2020-191836, mailed on Oct. 26, 2021, 8 pages.
Office Action for Japanese Application No. 2020-191838, mailed on Oct. 26, 2021, 8 pages.
Office Action for Japanese Application No. 2022-010005, mailed on Mar. 15, 2022, 3 pages.
Office Action for Korean Application No. 10-2018-7037677, dated May 12, 2021, 4 pages.
Office Action for Korean Application No. 10-2018-7037677, mailed on Mar. 29, 2021, 6 pages.
Office Action for Korean Application No. 10-2020-7011369, mailed May 10, 2022, 18 pages.
Office Action for Korean Application No. 10-2021-7018056, mailed on Oct. 27, 2021, 21 pages.
Office Action for Korean Application No. 10-2021-7023346, mailed on Dec. 14, 2021, 40 pages.
Office Action for Malaysian Application No. PI2018002742, dated Apr. 21, 2021, 4 pages.
Office Action for Russian Application No. 2020135808, mailed on Apr. 23, 2021, 12 pages.
Office Action for Russian Application No. 2020135851, mailed on May 24, 2021, 13 pages.
Office Action for Ukraine Application No. a201813017, mailed May 6, 2022, 3 pages.
Office Action mailed Mar. 1, 2019 for Canadian Application No. 2996341, 4 pages.
Office Action mailed Sep. 9, 2020 for Chinese Application No. 201780040874.1, 20 pages.
Office Action mailed Dec. 11, 2019 for Brazilian Application No. BR1120180085138, 6 pages.

(56) References Cited

OTHER PUBLICATIONS

Office Action mailed May 12, 2021 for Chinese Application No. 201780040874.1, 15 pages.
Office Action mailed May 12, 2021 for Korean Application No. 10-2018-7037693, 7 pages.
Office Action mailed Sep. 15, 2020 for Japanese Application No. 2018-567854, 8 pages.
Office Action mailed Feb. 16, 2021 for Japanese Application No. 2018-567856, 2 pages.
Office Action mailed Aug. 19, 2020 for KR Application No. 20187037693, filed Jun. 27, 2017, 21 pages.
Office Action mailed Mar. 2, 2021 for Japanese Application No. 2018-567947, 4 pages.
Office Action mailed Mar. 22, 2019 for Korean Application No. 10-2018-7012422, 19 pages.
Office Action mailed Mar. 22, 2019 for Korean Application No. 10-2018-7012428, 22 pages.
Office Action mailed Jul. 23, 2019 for Japanese Application No. 2018-521928, 14 pages.
Office Action mailed Jul. 23, 2019 for Japanese Application No. 2018-522061, 9 pages.
Office Action mailed Feb. 25, 2020 for Japanese Application No. 2018-567854, 7 pages.
Office Action mailed Feb. 25, 2020 for Japanese Application No. 2018-567947, 6 pages.
Office Action mailed Feb. 25, 2020 for Japanese Application No. 2018-567856, 6 pages.
Office Action mailed Jun. 25, 2019 for Japanese Application No. 2018-519932, 5 pages.
Office Action mailed Sep. 26, 2019 for Korean Application No. 10-2018-7012353, 15 pages.
Office Action mailed Dec. 27, 2019 for Chinese Application No. 201680049091, 25 pages.
Office Action mailed Mar. 28, 2019 for Canadian Application No. 3003520, 3 pages.
Office Action mailed Mar. 29, 2019 for Korean Application No. 10-2018-7012366, 6 pages.
Office Action mailed Oct. 29, 2018 for Russian Application No. 2018115542, 9 pages.
Office Action mailed Feb. 4, 2020 for Japanese Application No. 2018-507621, 29 pages.
Office Action mailed Feb. 7, 2019 for Korean Application No. 10-2018-7006076, 10 pages.
Office Action mailed May 7, 2019 for Japanese Application No. 2018-507621, 8 pages.
Office Action mailed Dec. 9, 2019 for Canadian Application No. 3003521, 6 pages.
Office Action mailed Apr. 29, 2021, for Malaysian Application No. PI2018701525, 3 pages.
Todaka T., et al., "Low Curie Temperature Material for Induction Heating Self-Temperature Controlling System," Journal of Magnetism and Magnetic Materials, vol. 320 (20), Oct. 2008, pp. e702-e707.
Communication pursuant to Article 94(3) EPC for Application No. 17740631.1 mailed on Oct. 18, 2022, 6 pages.
Office action for Brazilian Application No. 112020005010-5, mailed on Jul. 21, 2022, 4 pages.
Office Action for Chinese Application No. 201780040300.4, mailed on Apr. 26, 2022, 9 pages.
Office Action for Chinese Application No. 201880059756.X, mailed Sep. 23, 2022, 6.
Office action for Korean Application No. 10-2020-7007392, mailed Sep. 26, 2022, 15.
Office action for Korean Application No. 10-2020-7018918, mailed on Jul. 27, 2022, 6 pages.
Office Action mailed Jun. 22, 2022 for Russian Application No. 2019107295, 8 pages.
"Decision of Refusal received for Japanese Patent Application No. 2020-191838, mailed on Feb. 28, 2023", 6 pages (3 pages of English Translation and 3 pages of Official Copy).
"Extended Search Report received for European Patent Application No. 22166210.9, mailed on Oct. 31, 2022", 11 pages.
"International Preliminary Report on Patentability received for PCT Patent Application No. PCT/EP2018/083795, mailed on Jun. 18, 2020", 8 pages.
"International Preliminary Report on Patentability received for PCT Patent Application No. PCT/EP2021/075735, mailed on Apr. 13, 2023", 11 pages.
"International Search Report and Written Opinion received for PCT Patent Application No. PCT/EP2021/075735, mailed on Jan. 5, 2022", 17 pages.
"Notice of Reasons for Refusal received for Japanese Patent Application No. 2022-011143, mailed on Mar. 28, 2023", 12 pages (6 pages of English Translation and 6 pages of Official Copy).
"Notice of Reasons for Refusal received for Japanese Patent Application No. 2022-048457, mailed on Jan. 31, 2023", 15 pages (8 pages of English Translation and 7 pages of Official Copy).
"Notice of Reasons for Rejection for Japanese Application No. 2022-139703, mailed on Jul. 25, 2023", 6 pages. (3 pages of English Translation and 3 pages of Official Copy).
"Notice of Reasons of Refusal received for Japanese Patent Application No. 2020-191838, mailed on Jul. 5, 2022", 6 pages (3 pages of English Translation and 3 pages of Official Copy).
"Office Action received for Australian Patent Application No. 2022200981, mailed on Dec. 15, 2022", 3 pages.
"Office Action received for Brazilian Patent Application No. 112018077348-4, mailed on Oct. 25, 2022", 1 page (Official Copy Only).
"Office Action received for Brazilian Patent Application No. 112018077348-4, mailed on Sep. 2, 2022", 5 pages (Official Copy Only).
"Office Action received for Brazilian Patent Application No. 122022011678-7, mailed on Mar. 7, 2023", 10 pages (Official Copy Only).
"Office Action received for European Patent Application No. 16798649.6, mailed on Jan. 3, 2022", 7 pages.
"Office Action received for European Patent Application No. 16798649.6, mailed on May 25. 2022", 5 pages.
"Office Action received for European Patent Application No. 16798650.4, mailed on Mar. 6, 2020", 4 pages.
"Office Action received for European Patent Application No. 20202666.2, mailed on Jul. 6, 2023", 8 pages.
"Office Action received for European Patent Application No. 20205060.5, mailed on Jul. 28, 2023", 8 pages.
"Office Action received for Korean Patent Application No. 10-2020-7018748, mailed on Jun. 28, 2023", 14 pages (8 pages of English Translation and 6 pages of Official Copy).
"Office Action received for Korean Patent Application No. 10-2022-7025860, mailed on Feb. 15, 2023", 18 pages (10 pages of English Translation and 8 pages of Official Copy).
"Reason for Rejection received for Korean Patent Application No. 10-2022-7025860, mailed on Aug. 11, 2023", 21 pages (12 pages of English Translation and 9 pages of Official Copy Only).
"Reasons for Refusal received for Japanese Patent Application No. 2022-111113, mailed on Aug. 29, 2023", 6 pages (3 pages of English Translation and 3 pages of Official Copy).
"Result of Consultation received for European Patent Application No. 16798650.4, mailed on Feb. 8, 2022", 4 pages.
"Notice of Reason for Refusal received for Japanese Patent Application No. 2022-160803, mailed on Nov. 14, 2023", 7 pages (3 pages of English Translation and 4 pages of Official Copy).
"Office Action received for Canadian Patent Application No. 3,171,963, mailed on Nov. 22, 2023", 7 pages.
"Reasons for Rejection received for Korean Patent Application No. 10-2021-7016788, mailed on Dec. 1, 2023", 12 pages (6 pages of English Translation and 6 pages of Official Copy).

* cited by examiner

ARTICLE FOR USE WITH APPARATUS FOR HEATING SMOKABLE MATERIAL

PRIORITY CLAIM

The present application is a continuation application of U.S. patent application Ser. No. 15/772,391, filed Apr. 30, 2018, which is a National Phase entry of PCT Application No. PCT/EP2016/075738, filed Oct. 26, 2016, which claims priority from U.S. patent application Ser. No. 14/927,537, filed Oct. 30, 2015, each of which is hereby fully incorporated herein by reference.

TECHNICAL FIELD

The present disclosure relates to articles for use with apparatus for heating smokable material to volatilize at least one component of the smokable material, and to systems comprising such apparatus and such articles.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides an article for use with apparatus for heating smokable material to volatilize at least one component of the smokable material, the article comprising: a malleable container defining a cavity; a mass of smokable material in the cavity; and heating material that is heatable by penetration with a varying magnetic field to heat the smokable material.

In an exemplary embodiment, the container comprises a sachet.

In an exemplary embodiment, the container defines an exterior of the article.

In an exemplary embodiment, at least a portion of the container is porous for permitting volatilized material generated by heating the smokable material within the cavity to leave the cavity.

In an exemplary embodiment, the heating material is in the cavity.

In an exemplary embodiment, the heating material is within the mass of smokable material.

In an exemplary embodiment, the article comprises a material that comprises a mixture of the smokable material and the heating material.

In an exemplary embodiment, the mixture comprises a mixture of the smokable material and elements, wherein each of the elements comprises heating material that is heatable by penetration with a varying magnetic field.

In an exemplary embodiment, each of the elements comprises a closed circuit of heating material that is heatable by penetration with a varying magnetic field.

In an exemplary embodiment, each of the elements consists entirely, or substantially entirely, of the heating material.

In an exemplary embodiment, the container is free of heating material that is heatable by penetration with a varying magnetic field to heat the smokable material.

In an exemplary embodiment, the container comprises the heating material.

In an exemplary embodiment, the article comprises a closed circuit of heating material that is heatable by penetration with a varying magnetic field.

In an exemplary embodiment, the container comprises a closed circuit of heating material that is heatable by penetration with a varying magnetic field.

In an exemplary embodiment, the container comprises a mesh that comprises the heating material.

In an exemplary embodiment, the heating material is in contact with the smokable material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

In an exemplary embodiment, the smokable material comprises tobacco and/or one or more humectants.

In an exemplary embodiment, a first portion of the heating material is more susceptible to eddy currents being induced therein by penetration with a varying magnetic field than a second portion of the heating material.

In an exemplary embodiment, the article comprises a catalytic material on at least a portion of the heating material.

In an exemplary embodiment, an exterior of the article has a length, a width perpendicular to the length, and a depth perpendicular to each of the length and the width, wherein the length is greater than or equal to the width, and wherein the width is greater than the depth.

A second aspect of the present disclosure provides an article for use with apparatus for heating smokable material to volatilize at least one component of the smokable material, the article comprising: a container defining a cavity; a mass of smokable material in the cavity; and heating material that is heatable by penetration with a varying magnetic field to heat the smokable material; wherein at least a portion of the container is porous for permitting volatilized material generated by heating the smokable material within the cavity to leave the cavity.

The article of the second aspect may have any one or more of the features discussed above as being present in respective exemplary embodiments of the article of the first aspect of the present disclosure.

A third aspect of the present disclosure provides a system, comprising: apparatus for heating smokable material to volatilize at least one component of the smokable material; and an article for use with the apparatus, the article comprising a container defining a cavity, and a mass of smokable material in the cavity; wherein the apparatus comprises a heating zone for receiving at least a portion of the article, and a magnetic field generator for generating a varying magnetic field to be used in heating the smokable material when the portion of the article is in the heating zone; and wherein the container is malleable, and/or a portion of the container is porous for permitting volatilized material generated by heating the smokable material within the cavity to leave the cavity.

In an exemplary embodiment, the apparatus comprises heating material that is heatable by penetration with the varying magnetic field to heat the smokable material when the portion of the article is in the heating zone.

In an exemplary embodiment, the article comprises heating material that is heatable by penetration with the varying magnetic field to heat the smokable material when the portion of the article is in the heating zone.

In an exemplary embodiment, the article of the system is the article of the first aspect of the present disclosure. The article of the system may have any one or more of the features discussed above as being present in respective exemplary embodiments of the article of the first aspect of the present disclosure.

In an exemplary embodiment, the article of the system is the article of the second aspect of the present disclosure. The article of the system may have any one or more of the features discussed above as being present in respective exemplary embodiments of the article of the second aspect of the present disclosure.

BRIEF DESCRIPTION OF THE DRAWINGS

Embodiments of the disclosure will now be described, by way of example only, with reference to the accompanying drawings, in which.

DETAILED DESCRIPTION

Figure 1:
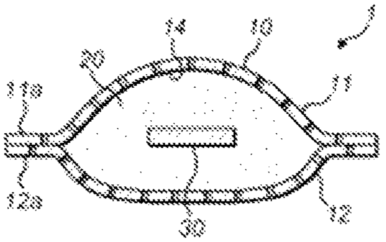
FIG. 1 shows a schematic cross-sectional view of an example of an article for use with apparatus for heating smokable material to volatilize at least one component of the smokable material.

As used herein, the term "smokable material" includes materials that provide volatilized components upon heating, typically in the form of vapor or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. "Smokable material" also may include other, non-tobacco, products, which, depending on the product, may or may not contain nicotine. "Smokable material" may comprise one or more humectants, such as glycerol or propylene glycol.

As used herein, the term "heating material" or "heater material" refers to material that is heatable by penetration with a varying magnetic field.

As used herein, the terms "flavor" and "flavorant" refer to materials which, where local regulations permit, may be used to create a desired taste or aroma in a product for adult consumers. They may include extracts (e.g., licorice, *Hydrangea*, Japanese white bark *Magnolia* leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, *Cassia*, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, gel, powder, or the like.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Referring to FIG. 1 there is shown a schematic cross-sectional view of an example of an article according to an embodiment of the disclosure. The article 1 comprises a malleable container 10 defining a cavity 14, a mass of smokable material 20 located in the cavity 14, and heating material that is heatable by penetration with a varying magnetic field to heat the smokable material 20. Examples of such heating material are described below. The article 1 is for use with apparatus for heating the smokable material 20 to volatilize at least one component of the smokable material 20 without burning the smokable material 20, such as the apparatus 100 shown in FIG. 4 and described below.

In this embodiment, the container 10 comprises a sachet 10. In this embodiment, the sachet 10 comprises a first wall 11 and a second wall 12, and together the first and second walls 11, 12 define the cavity 14. In other embodiments, the sachet 10 may comprise one wall that defines the cavity 14 or more than two walls that together define the cavity 14. In this embodiment, the first and second walls 11, 12 are separate components that have been attached to each other to define the sachet 10 and the cavity 14. More particularly, respective flanges 11*a*, 12*a* of the first and second walls 11, 12 are attached to each other. In other embodiments, the first and second walls 11, 12 may not have flanges as such. Such attachment may be by press-sealing, heat-sealing, welding, sonic welding, use of an adhesive, or the like. In other embodiments, the first and second walls 11, 12 may be respective portions of a single component, which may for example have been folded. Parts of the two portions may be attached to each other to define the sachet 10 and the cavity 14, such as by any of the attachment methods discussed above.

In this embodiment, the container 10 is porous for permitting volatilized material generated by heating the smokable material 20 within the cavity 14 to leave the cavity 14. In this embodiment, the container 10 is made of a material that is impermeable to the volatilized material but has a plurality of apertures extending therethrough for permitting the passage of the volatilized material from the cavity 14 to the exterior of the article 1. The container 10 may be, or may comprise, a mesh 47 (see, e.g., FIG. 3B). In a variation to this embodiment, the container 10 may be substantially impermeable to the volatilized material and have only one such aperture extending therethrough. In a further variation to this embodiment, the container 10 may be made of porous material. Such a porous container 10 may or may not have one or more apertures extending therethrough. The container 10 may be, for example, made from one or more porous materials selected from the group consisting of: fleece, viscose, non-woven material, non-woven fleece, woven material, knitted material, nylon, and polyester. In some embodiments, the container 10 is configured so as to prevent spilling of the smokable material 20 from the cavity 14.

In this embodiment, each of the first and second walls 11, 12 is porous for permitting volatilized material generated by heating the smokable material 20 within the cavity 14 to leave the cavity 14. In other embodiments, only a portion, such as one of the first and second walls 11, 12, of the container 10 is porous. One or each of the walls 11, 12 may be, for example, made from one or more porous materials selected from the group discussed above. In still other embodiments, the container 10 may be non-porous, so as to prevent or substantially prevent volatilized material generated by heating the smokable material 20 within the cavity 14 to leave the cavity 14 until the container 10 is punctured by a user or a device to place the cavity 14 in fluid communication with the exterior of the container 10.

It can be advantageous for the container 10 to be made from a material that is resistant to heat at least over the expected range of operating temperatures of the apparatus that will arise in operation, such as for example 180 to 220 degrees Celsius.

In this embodiment, the container 10 itself is free of heating material that is heatable by penetration with a varying magnetic field. In this embodiment, the heating material of the article 1 is located in the cavity 14. In this embodiment, the heating material is within the mass of smokable material 20. More specifically, in this embodiment, the heating material is entirely enveloped or surrounded by the mass of smokable material 20. Therefore, as the heating material is heated by a varying magnetic field in use, heat dissipated from the heating material heats the mass of smokable material 20.

In this embodiment, the article comprises a body 30, which comprises the heating material. In some embodiments, the body 30 may consist entirely, or substantially entirely, of the heating material. In this embodiment, the body 30 is in the form of a square or rectangular slab. However, in other embodiments, the body 30 may, for example, be cylindrical, spherical, ovoid, toroidal, polygonal, star-shaped, radially-finned, or the like.

In this embodiment, a cross section of the body 30 is constant along a length of the body 30. Moreover, in this embodiment, the body 30 is planar, or substantially planar. However, in other embodiments, this may not be the case. For example, in some embodiments, the body 30 may follow a wavelike or wavy path. The path may be a sinusoidal path. In some embodiments, the body 30 may be twisted or corrugated. In still further embodiments, the body 30 may be helical, a spiral shape, comprise a plate or strip or ribbon having protrusions thereon and/or indentations therein, comprise a mesh, comprise expanded metal, or have a non-uniform non-planar shape.

Such non-planar shapes of the body 30 may help air passing through the cavity 14 in use to pick up the volatilized material created when the smokable material 20 is heated. Non-planar shapes can provide a tortuous path for air to follow, creating turbulence in the air and causing better heat transfer from the heating material to the smokable material 20. The non-planar shapes can also increase the surface area of the body 30 per unit length of the body 30. This can result in greater or improved Joule heating of the heating material, and thus greater or improved heating of the smokable material 20.

In other embodiments, the body 30 of the article 1 may take the form of a liner between the mass of smokable material 20 and the container 10. In some embodiments, the mass of smokable material 20 may be entirely enveloped or surrounded by the liner. Such a liner may be porous for permitting volatilized material generated by heating the smokable material 20 within the cavity 14 to leave the cavity 14, or may be non-porous to such volatilized material until punctured.

Figure 2:
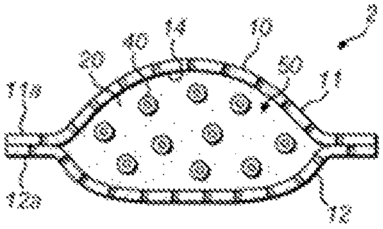
FIG. 2 shows a schematic cross-sectional view of an example of another article for use with apparatus for heating smokable material to volatilize at least one component of the smokable material.

Referring to FIG. 2 there is shown a schematic cross-sectional view of an example of another article according to an embodiment of the disclosure. The article 2 of FIG. 2 is identical to the article 1 described above with reference to FIG. 1, other than the manner in which heating material is provided in the article 1. Any of the herein-described possible variations to the article 1 of FIG. 1 may be made to the article 2 of FIG. 2 to form separate respective embodiments.

The malleable container 10 of the article 2 of FIG. 2 is the same as that discussed above of the article 1 of FIG. 1, and so in the interests of conciseness will not be described again in detail.

In this embodiment, the heating material again is in the cavity 14 of the container 10. Furthermore, in this embodiment, the heating material again is within the mass of smokable material 20. However, in this embodiment, the article 2 comprises a material 50 that comprises a mixture of the smokable material 20 and the heating material. More specifically, the mixture comprises a mixture of the smokable material 20 and elements 40, wherein each of the elements comprises heating material that is heatable by penetration with a varying magnetic field. The elements 40 are heatable in use to heat the smokable material 20. In this embodiment, the elements 20 are dispersed throughout the material 50.

In this embodiment, each of the elements 40 comprises a closed circuit of heating material that is heatable by penetration with a varying magnetic field. In some embodiments, this can result in magnetic coupling between the elements and an electromagnet of the apparatus in use being enhanced, which results in greater or improved Joule heating.

In this embodiment, each of the elements 40 is loop-shaped. More specifically, in this embodiment, each of the elements 40 is ring-shaped. A loop-shaped element may be of any shape that defines a path that starts and ends at the same point so as to create a closed circuit, whereas a ring-shaped element necessarily is circular or substantially circular. A ring shaped element can have a large surface area to weight ratio, which can help to avoid the elements tending to cluster by settling due to gravity. A ring shaped element can have a small cross-sectional area to diameter ratio. Therefore, the circulating current in the ring when subjected to a varying magnetic field may penetrate most or all of the ring, rather than be confined to just a "skin" thereof as can be the case when a susceptor has too greater a thickness. Thus, a more efficient use of material is achieved and, in turn, costs are reduced.

In variations to the illustrated embodiment, one or more or all of the elements 40 comprising a closed circuit of heating material may be other than ring-shaped. For example, one or more or all of the elements 40 may be spherical, be formed from a plurality of discrete strands of the heating material, or comprise a carrier that is free of heating material and that carries the closed circuit of heating material.

In this embodiment, each of the elements 40 consists entirely, or substantially entirely, of the heating material. However, in other embodiments, one or more of the elements 40 may comprise a carrier that is free of heating material and that carries the heating material. For example, one or more of the elements may comprise a ring-shaped carrier free of heating material with a closed-circuit of the heating material coated thereon.

In some other embodiments, one or more or all of the elements 40 may comprise heating material arranged other than as a closed circuit. For example, one or more or all of the elements 40 may comprise an open circuit of heating material, or one or a plurality of discrete portions of heating material.

Figure 3A:
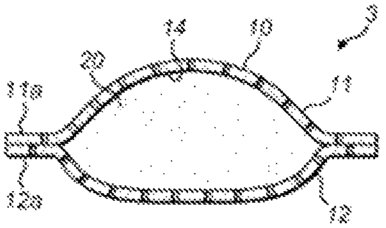
FIG. 3A shows a schematic cross-sectional view of an example of another article for use with apparatus for heating smokable material to volatilize at least one component of the smokable material.
Figure 3B:
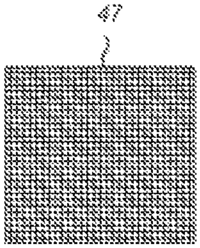
FIG. 3B shows a schematic view of an example mesh.

Referring to FIG. 3 there is shown a schematic cross-sectional view of an example of another article according to an embodiment of the disclosure. The article 3 of FIG. 3 is of similar overall shape to the article 2 described above with reference to FIG. 2, but differs both in the composition of the container 10 and the contents of the cavity 14. Any of the herein-described possible variations to the articles 1, 2 of FIGS. 1 and 2 may be made to the article 3 of FIG. 3 to form separate respective embodiments.

In this embodiment, the malleable container 10 itself of the article 3 comprises heating material that is heatable by penetration with a varying magnetic field to heat the smokable material 20. The container 10 may consist entirely, or substantially entirely, of the heating material. Alternatively, the container 10 may comprise a body that is free of heating material and that carries the heating material.

In some embodiments, the container 10 may comprise a closed circuit of heating material that is heatable by penetration with a varying magnetic field to heat the smokable material 20. In some embodiments, this can result in magnetic coupling between the container 10 and an electromagnet of the apparatus in use being enhanced, which results in greater or improved Joule heating. In some embodiments, the container 10 may additionally or alternatively comprise one or a plurality of discrete portions of heating material.

In this embodiment, the container 10 comprises a mesh 47 that comprises the heating material. The mesh 47 itself may define one or a plurality of closed circuits of the heating material.

In this embodiment, the cavity 14 of the container 10 contains a mass of smokable material 20. The cavity is itself free, or substantially free, of heating material. However, in some embodiments, the container 10 may comprise heating material, and the cavity 14 may also contain heating material. For example, the cavity 14 may comprise any of the above-described arrangements of heating material in the cavity 14.

The container 10 of each of the articles 1, 2, 3 discussed above is malleable. By "malleable" it is meant that the container 10 is able to be pressed, squeezed or compressed by a user or apparatus so as to take on different overall shapes without breaking or cracking. Accordingly, in use the container 10 may be re-shaped to fit more closely with the apparatus with which the article 1, 2, 3 is to be used, which may help to effect alignment of the heating material with a varying magnetic field generated by the apparatus. In other embodiments, the container 10 may be non-malleable or substantially non-malleable.

Figure 3C:
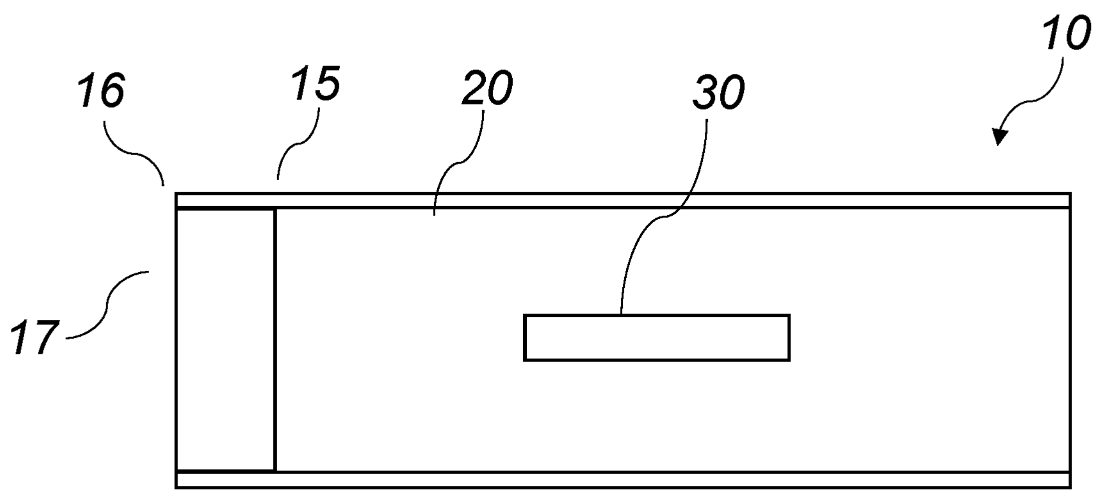
FIG. 3C shows a cross-sectional view of a pod or a cartridge.

In each of the embodiments discussed above, the malleable container 10 is a sachet. However, in other embodiments, the malleable container 10 could be other than a sachet. For example, in some embodiments the malleable container 10 may be a pod, pot or cartridge as illustrated in FIG. 3C. Such an alternative container 10 may comprise a vessel 15 that defines the cavity 14 and an opening 16 into the cavity 14, and a seal 17 sealing the opening. In some embodiments, the seal and/or the vessel may be porous. In some embodiments, the seal and/or the vessel may be puncturable by a user or a device. In some embodiments, the seal may be detachable from the container 10 or otherwise movable relative to the container 10 by a user to place the cavity 14 in fluid communication with the exterior of the container 10 via the opening.

In some embodiments, the article 1, 2, 3 or container 10 has a circular exterior cross section. In some embodiments, the exterior of the article 1, 2, 3 or container 10 may be rotationally symmetrical and other than circular, such as elliptical, triangular or square. This can help a user to position the article 1, 2, 3 appropriately relative to the apparatus with which the article 1, 2, 3 is to be used, so that the article 1, 2, 3 may be readily located in the heating zone of the apparatus for effective alignment of the heating material with a varying magnetic field generated by the apparatus. In other embodiments, the article 1, 2, 3 or container 10 may be rotationally asymmetrical.

In each of the embodiments discussed above, the container 10 defines the exterior of the article 1, 2, 3. In other embodiments that may not be the case. For example, in some embodiments the article may comprise a further element that defines some or all of the exterior of the article. Such a further element may, for example, comprise a housing within which at least a portion of the container 10 is located.

In each of the embodiments discussed above, the heating material is aluminum. However, in other embodiments, the heating material may comprise one or more materials selected from the group consisting of: an electrically-conductive material, a magnetic material, and a magnetic electrically-conductive material. In some embodiments, the heating material may comprise a metal or a metal alloy. In some embodiments, the heating material may comprise one or more materials selected from the group consisting of: aluminum, gold, iron, nickel, cobalt, conductive carbon, graphite, plain-carbon steel, stainless steel, ferritic stainless steel, copper, and bronze. Other heating material(s) may be used in other embodiments. In some embodiments, the heating material may be magnetic. It has also been found that, when magnetic electrically-conductive material is used as the heating material, magnetic coupling between the magnetic electrically-conductive material and an electromagnet of the apparatus in use may be enhanced. In addition to potentially enabling magnetic hysteresis heating, this can result in greater or improved Joule heating of the heating material, and thus greater or improved heating of the smokable material 20.

In each of the articles 1, 2, 3 shown in FIGS. 1 to 3, the heating material is in contact with the smokable material 20. Thus, when the heating material is heated by penetration with a varying magnetic field, heat may be transferred directly from the heating material to the smokable material 20. In other embodiments, the heating material may be kept out of contact with the smokable material 20. For example, in some embodiments, the article 1, 2, 3 may comprise a thermally-conductive barrier that is free of heating material and that spaces the heating material from the smokable material 20. In some embodiments, the thermally-conductive barrier may be a coating on the heating material. The provision of such a barrier may be advantageous to help to dissipate heat to alleviate hot spots in the heating material.

Figure 5:
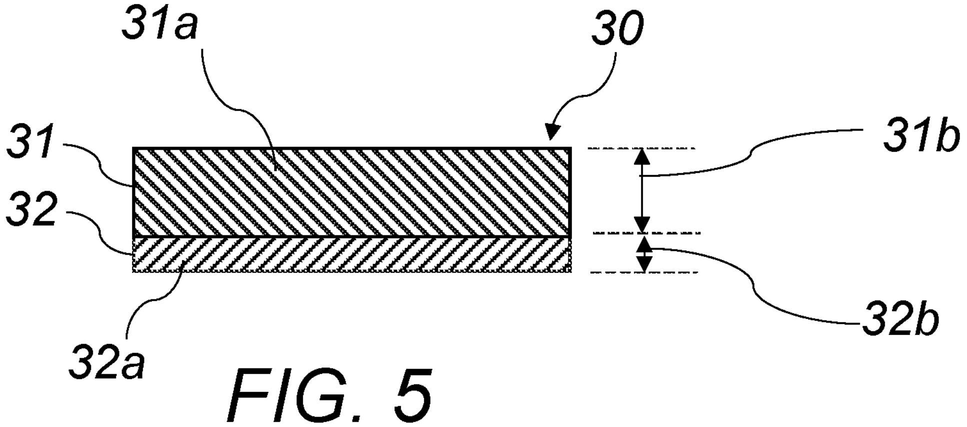
FIG. 5 shows a cross-sectional view of a representative example of a heating material.

In some embodiments, which may be respective variations to the embodiments discussed above and as represented by FIG. 5, a first portion 31 of the heating material of the article 1, 2, 3 may be more susceptible to eddy currents being induced therein by penetration with a varying magnetic field than a second portion 32 of the heating material of the article 1, 2, 3. The first portion 31 of the heating material may be more susceptible as a result of the first portion 31 of the heating material being made of a first material **31*a*, the second portion 32 of the heating material being made of a different second material 32*a*, and the first material 31*a* being of a higher susceptibility to eddy currents being induced therein than the second material 32*a*. For example, one of the first and second portions 31, 32 may be made of iron, and the other of the first and second portions may be made of graphite. Alternatively or additionally, the first portion 31 of the heating material may be more susceptible as a result of a first portion of a component comprising the first portion 31 of the heating material having a different first thickness 31*b* to a second thickness 32*b* of the second portion 32 of the component that comprises the second portion of the heating material as illustrated in FIG. 5**.

Such varying susceptibility of the heating material to eddy currents being induced therein can help achieve progressive heating of the smokable material 20, and thereby progressive generation of vapor. For example, the higher susceptibility portion may be able to heat a first region of the smokable material 20 relatively quickly to initialize volatilization of at least one component of the smokable material 20 and formation of vapor in the first region of the smokable material 20. The lower susceptibility portion may be able to heat a second region of the smokable material 20 relatively slowly to initialize volatilization of at least one component of the smokable material 20 and formation of vapor in the second region of the smokable material 20. Accordingly, vapor is able to be formed relatively rapidly for inhalation by a user, and vapor can continue to be formed thereafter for subsequent inhalation by the user even after the first region of the smokable material 20 may have ceased generating vapor. The first region of the smokable material 20 may cease generating the vapor when it becomes exhausted of volatilizable components of the smokable material 20.

In other embodiments, all of the heating material of the article 1, 2, 3 may be equally, or substantially equally, susceptible to eddy currents being induced therein by penetration with a varying magnetic field. In some embodiments, the heating material may not be susceptible to such eddy currents. In such embodiments, the heating material may be a magnetic material that is non-electrically-conductive, and thus may be heatable by the magnetic hysteresis process discussed above.

In some embodiments, which may be respective variations to the embodiments discussed above, the article 1, 2, 3 may comprise a plurality of bodies, wherein each of the bodies comprises heating material that is heatable by penetration with a varying magnetic field. At least one of the plurality of bodies may be more susceptible to eddy currents being induced therein by penetration with a varying magnetic field than at least one of the other of the plurality of bodies. This may be effected by the bodies being made of different heating materials and/or having different thicknesses, for example, as discussed above. Again, such varying susceptibility of the bodies can help achieve progressive heating of the smokable material 20, and thereby progressive generation of vapor, in a manner corresponding to that described above.

In some embodiments, the article 1, 2, 3 may comprise a catalytic material on at least a portion of the heating material. The catalytic material may take the form of a coating on the heating material. The catalytic material may be provided on all surface(s) of the heating material, or on only some of the surface(s) of the heating material. The provision of such a catalytic material on the heating material means that, in use, the article 1, 2, 3 may have a heated, chemically active surface. In use, the catalytic material may act to convert, or increase the rate of conversion of, a potential irritant to something that is less of an irritant.

In each of the embodiments discussed above, an exterior of the article 1, 2, 3 has a length L, a width W perpendicular to the length L, and a depth D perpendicular to each of the length L and the width W. In each of the embodiments discussed above, the length L is equal or substantially equal to the width W, and the width W is greater than the depth D. However, in other embodiments, the length L may be greater than the width W. The smaller the depth D relative to the width W, the greater the surface area of the exterior of the article 1, 2, 3 for a given volume of the article 1, 2, 3. This can result in greater or improved heating of the smokable material 20 in use, and/or greater, easier or improved release from the article 1, 2, 3 of volatilized material created when the smokable material 20 is heated. However, in other embodiments, the exterior of the article 1, 2, 3 may be otherwise proportioned.

In some embodiments, which may be respective variations to the embodiments discussed above, the article 1, 2, 3 may comprise a mouthpiece defining a passageway that is in fluid communication with the mass of smokable material 20. The mouthpiece may be made of any suitable material, such as a plastics material, cardboard, cellulose acetate, paper, metal, glass, ceramic, or rubber. In use, when the smokable material 20 is heated, volatilized components of the smokable material 20 can be readily inhaled by a user. In embodiments in which the article is a consumable article, once all or substantially all of the volatilizable component(s) of the smokable material 20 in the article has/have been spent, the user may dispose of the mouthpiece together with the rest of the article. This can be more hygienic than using the same mouthpiece with multiple articles, can help ensure that the mouthpiece is correctly aligned with the smokable material, and presents a user with a clean, fresh mouthpiece each time they wish to use another article. The mouthpiece, when provided, may comprise or be impregnated with a flavorant. The flavorant may be arranged so as to be picked up by heated vapor as the vapor passes through the passageway of the mouthpiece in use.

In some embodiments, any one of the articles 1, 2, 3 discussed above may comprise thermal insulation. The thermal insulation may, for example, be on an inner face or side of the container 10 facing the smokable material 20. Alternatively or additionally, the thermal insulation may form part or all of the container 10. The thermal insulation may comprise one or more materials selected from the group consisting of: aerogel, vacuum insulation, wadding, fleece, non-woven material, non-woven fleece, woven material, knitted material, nylon, foam, polystyrene, polyester, polyester filament, polypropylene, a blend of polyester and polypropylene, cellulose acetate, paper or card, and corrugated material such as corrugated paper or card. The thermal insulation may additionally or alternatively comprise an air gap. Such thermal insulation can help prevent heat loss to components of the apparatus with which the article 1, 2, 3 is used, and provide more efficient heating of the smokable material 20 within the article 1, 2, 3.

Each of the above-described articles 1, 2, 3 and described variants thereof may be used with an apparatus for heating the smokable material 20 to volatilize at least one component of the smokable material 20. The apparatus may be to heat the smokable material 20 to volatilize the at least one component of the smokable material 20 without burning the smokable material 20. Any one of the article(s) 1, 2, 3 and such apparatus may be provided together as a system. The system may take the form of a kit, in which the article 1, 2, 3 is separate from the apparatus. Alternatively, the system may take the form of an assembly, in which the article 1, 2, 3 is combined with the apparatus. An example such system will now be described with reference to FIG. 4.

Figure 4:
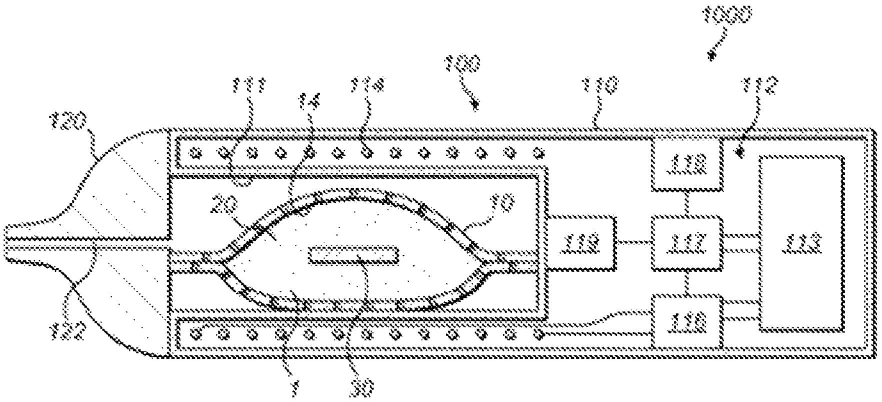
FIG. 4 shows a schematic cross-sectional view of an example of a system comprising the article of FIG. 1 and apparatus for the heating smokable material of the article to volatilize at least one component of the smokable material.

Referring to FIG. 4 there is shown a schematic cross-sectional view of an example of a system according to an embodiment of the disclosure. The system 1000 of this embodiment comprises an article 1 comprising a malleable container 10 defining a cavity 14, and a mass of smokable material 20 in the cavity 14, and apparatus 100 for heating the smokable material 20 of the article 1 to volatilize at least one component of the smokable material 20. In this embodiment, the article 1 of the system 1000 is the article 1 of FIG. 1. However, in other embodiments, the article of the system 1000 may be an article other than the article 1 of FIG. 1, such as one of the articles 2, 3 of FIGS. 2 and 3. Broadly speaking, the apparatus 100 comprises a heating zone 111 for receiving at least a portion of the article 1, 2, 3, and a magnetic field generator 112 for generating a varying magnetic field to be used in heating the smokable material 20 when the portion of the article 1, 2, 3 is in the heating zone 111.

The apparatus 100 of this embodiment comprises a body 110 and a mouthpiece 120. The mouthpiece 120 defines a channel 122 therethrough. The mouthpiece 120 is locatable relative to the body 110 so as to cover an opening into the heating zone 111. When the mouthpiece 120 is so located relative to the body 110, the channel 122 of the mouthpiece 120 is in fluid communication with the heating zone 111. In use, the channel 122 acts as a passageway for permitting volatilized material to pass from the cavity 14 of the article 1, 2, 3 inserted in the heating zone 111 to an exterior of the apparatus 100. In this embodiment, the mouthpiece 120 of the apparatus 100 is releasably engageable with the body 110 so as to connect the mouthpiece 120 to the body 110. In other embodiments, the mouthpiece 120 and the body 110 may be permanently connected, such as through a hinge or flexible member. The mouthpiece 120 of the apparatus 100 may comprise or be impregnated with a flavorant. The flavorant may be arranged so as to be picked up by heated vapor as the vapor passes through the channel 122 of the mouthpiece 120 in use. In some embodiments, such as embodiments in which the article 1, 2, 3 itself comprises a mouthpiece, the mouthpiece 120 of the apparatus 100 may be omitted.

In this embodiment, the body 110 comprises the heating zone 111. In this embodiment, the heating zone 111 comprises a recess 111 for receiving at least a portion of the article 1. In other embodiments, the heating zone 111 may be other than a recess, such as a shelf, a surface, or a projection, and may require mechanical mating with the article 1, 2, 3 in order to co-operate with, or receive, the article 1, 2, 3. In this embodiment, the heating zone 111 is elongate, and is sized and shaped to receive the article 1. In this embodiment, the heating zone 111 accommodates the whole article 1. In other embodiments, the heating zone 111 may be dimensioned to receive only a portion of the article 1, 2, 3.

In some embodiments, the apparatus 100 may comprise a mechanism for compressing an article 1, 2, 3 when the article 1, 2, 3 is located in the heating zone 111. Such compression of the article 1, 2, 3 may compress the smokable material 20, so as to increase the thermal conductivity of the smokable material 20. In other words, compression of the smokable material 20 can provide for higher heat transfer through the article 1, 2, 3. Such compression should not be so great as to burst or break the container 10 or to prevent a user to be able to draw volatilized material from the article 1, 2, 3.

In this embodiment, the magnetic field generator 112 comprises an electrical power source 113, a coil 114, a device 116 for passing a varying electrical current, such as an alternating current, through the coil 114, a controller 117, and a user interface 118 for user-operation of the controller 117.

In this embodiment, the electrical power source 113 is a rechargeable battery. In other embodiments, the electrical power source 113 may be other than a rechargeable battery, such as a non-rechargeable battery, a capacitor, a battery-capacitor hybrid, or a connection to a mains electricity supply.

The coil 114 may take any suitable form. In this embodiment, the coil 114 is a helical coil of electrically-conductive material, such as copper. In some embodiments, the magnetic field generator 112 may comprise a magnetically permeable core around which the coil 114 is wound. Such a magnetically permeable core concentrates the magnetic flux produced by the coil 114 in use and makes a more powerful magnetic field. The magnetically permeable core may be made of iron, for example. In some embodiments, the magnetically permeable core may extend only partially along the length of the coil 114, so as to concentrate the magnetic flux only in certain regions.

In this embodiment, the coil 114 of the magnetic field generator 112 extends along a longitudinal axis that is substantially coincident with a longitudinal axis of the heating zone 111. In other embodiments, these axes may be aligned with each other by being parallel to each other, or may be oblique to each other.

In this embodiment, an impedance of the coil 114 of the magnetic field generator 112 is equal, or substantially equal, to an impedance of the body 30 comprising heating material in the article 1. If the impedance of the body 30 of the article 1 were instead lower than the impedance of the coil 114, then the voltage generated across the body 30 of the article 1 in use may be lower than the voltage that may be generated across the body 30 of the article 1 when the impedances are matched. Alternatively, if the impedance of the body 30 of the article 1 were instead higher than the impedance of the coil 114, then the electrical current generated in the body 30 of the article 1 in use may be lower than the current that may be generated in the body 30 of the article 1 when the impedances are matched. In embodiments of the system 1000 comprising one of the articles 2, 3 of FIGS. 2 and 3, similarly the impedance of the coil 114 may be equal, or substantially equal, to an impedance of the part of the article 2, 3 comprising heating material. Matching the impedances may help to balance the voltage and current to maximize the heating power generated at the heating material of the article 1, 2, 3 when heated in use.

In this embodiment, the device 116 for passing a varying current through the coil 114 is electrically connected between the electrical power source 113 and the coil 114. In this embodiment, the controller 117 also is electrically connected to the electrical power source 113, and is communicatively connected to the device 116 to control the device 116. More specifically, in this embodiment, the controller 117 is for controlling the device 116, so as to control the supply of electrical power from the electrical power source 113 to the coil 114. In this embodiment, the controller 117 comprises an integrated circuit (IC), such as an IC on a printed circuit board (PCB). In other embodiments, the controller 117 may take a different form. In some embodiments, the apparatus may have a single electrical or electronic component comprising the device 116 and the controller 117. The controller 117 is operated in this embodiment by user-operation of the user interface 118. In this embodiment, the user interface 118 is located at the exterior of the body 110. The user interface 118 may comprise a push-button, a toggle switch, a dial, a touchscreen, or the like. In other embodiments, the user interface 118 may be remote and connected to the rest of the apparatus wirelessly, such as via Bluetooth.

In this embodiment, operation of the user interface 118 by a user causes the controller 117 to cause the device 116 to cause an alternating electrical current to pass through the coil 114, so as to cause the coil 114 to generate an alternating magnetic field. When the article 1, 2, 3 is located in the heating zone 111, the coil 114 of the apparatus 100 and the heating material of the article 1, 2, 3 are suitably relatively positioned so that the alternating magnetic field produced by the coil 114 penetrates the heating material of the article 1, 2, 3. When the heating material of the article 1, 2, 3 is an electrically-conductive material, this may cause the generation of one or more eddy currents in the heating material. The flow of eddy currents in the heating material against the electrical resistance of the heating material causes the heating material to be heated by Joule heating. As mentioned above, when the heating material is made of a magnetic material, the orientation of magnetic dipoles in the heating material changes with the changing applied magnetic field, which causes heat to be generated in the heating material.

The apparatus 100 of this embodiment comprises a temperature sensor 119 for sensing a temperature of the heating zone 111. The temperature sensor 119 is communicatively connected to the controller 117, so that the controller 117 is able to monitor the temperature of the heating zone 111. In some embodiments, the temperature sensor 119 may be arranged to take an optical temperature measurement of the recess, heating zone or article 1, 2, 3. In some embodiments, the article 1, 2, 3 may comprise a temperature detector, such as a resistance temperature detector (RTD), for detecting a temperature of the article 1, 2, 3. For example, the temperature detector may be located in or on the container 10 of the article 1, 2, 3. The article 1, 2, 3 may further comprise one or more terminals connected, such as electrically-connected, to the temperature detector. The terminal(s) may be for making connection, such as electrical connection, with a temperature monitor of the apparatus 100 when the article 1, 2, 3 is in the heating zone 111. The controller 117 may comprise the temperature monitor. The temperature monitor of the apparatus 100 may thus be able to determine a temperature of the article 1, 2, 3 during use of the article 1, 2, 3 with the apparatus 100.

In some embodiments, by providing that the heating material of the article 1, 2, 3 has a suitable resistance, the response of the heating material to a change in temperature could be sufficient to give information regarding temperature inside the article 1, 2, 3. The temperature sensor 119 of the apparatus 100 may then comprise a probe for analyzing the heating material.

On the basis of one or more signals received from the temperature sensor 119 or temperature detector, the controller 117 may cause the device 116 to adjust a characteristic of the varying or alternating electrical current passed through the coil 114 as necessary, in order to ensure that the temperature of the heating zone 111 remains within a predetermined temperature range. The characteristic may be, for example, amplitude or frequency. Within the predetermined temperature range, in use the smokable material 20 within an article 1, 2, 3 located in the heating zone 111 is heated sufficiently to volatilize at least one component of the smokable material 20 without combusting the smokable material 20. Accordingly, the controller 117, and the apparatus 100 as a whole, is arranged to heat the smokable material 20 to volatilize the at least one component of the smokable material 20 without combusting the smokable material 20. In some embodiments, the temperature range is about 50° C. to about 300° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range. In some embodiments, the temperature sensor 119 may be omitted.

The apparatus 100 may define an air inlet that fluidly connects the heating zone 111 with the exterior of the apparatus 100. Such an air inlet may be defined by the body 110 of the apparatus 100 and/or by the mouthpiece 120 of the apparatus 100. A user may be able to inhale the volatilized component(s) of the smokable material 20 by drawing the volatilized component(s) through the channel 122 of the mouthpiece 120. As the volatilized component(s) are removed from the cavity 14 of the container 10 of the article 1, 2, 3, such as through a porous portion of the container 10 or through a hole in the container 10 after the container has been punctured by a user, air may be drawn into the heating zone 111 via the air inlet of the apparatus 100.

The apparatus may provide haptic feedback to a user. The feedback could indicate that heating is taking place, or be triggered by a timer to indicate that greater than a predetermined proportion of the original quantity of volatilizable component(s) of the smokable material 20 in the article 1, 2, 3 has/have been spent, or the like. The haptic feedback could be created by interaction of the coil 114 with the heating material of the article 1, 2, 3 (e.g. magnetic response), by interaction of an electrically-conductive element with the coil 114, by rotating an unbalanced motor, by repeatedly applying and removing a current across a piezoelectric element, or the like.

The apparatus 100 may comprise more than one coil. The plurality of coils of the apparatus 100 could be operable to provide progressive heating of the smokable material 20 in an article 1, 2, 3, and thereby progressive generation of vapor. For example, one coil may be able to heat a first region of the heating material relatively quickly to initialize volatilization of at least one component of the smokable material 20 and formation of a vapor in a first region of the smokable material 20. Another coil may be able to heat a second region of the heating material relatively slowly to initialize volatilization of at least one component of the smokable material 20 and formation of a vapor in a second region of the smokable material 20. Accordingly, a vapor is able to be formed relatively rapidly for inhalation by a user, and vapor can continue to be formed thereafter for subsequent inhalation by the user even after the first region of the smokable material 20 may have ceased generating vapor. The initially-unheated second region of smokable material 20 could act as a heat sink, to reduce the temperature of created vapor or make the created vapor mild, during heating of the first region of smokable material 20.

In some embodiments, the article 1, 2, 3 may comprise a plurality of discrete portions of heating material that is heatable by penetration with a varying magnetic field to heat the smokable material 20 of the article 1, 2, 3. The plurality of discrete portions of heating material may be substantially separately heatable by varying magnetic fields produced by a respective plurality of coils 114 of the apparatus 100. One of the plurality of discrete portions of heating material may be more susceptible to eddy currents being induced therein by penetration with a varying magnetic field than other(s) of the plurality of discrete portions of heating material. Such a structure could be operable to provide progressive heating of the smokable material 20 in the article 1, 2, 3, and thereby progressive generation of vapor, in a similar way to that described above.

In each of the embodiments discussed above, the heating material may have a skin depth, which is an exterior zone within which most of an induced electrical current and/or induced reorientation of magnetic dipoles occurs. By providing that the component comprising the heating material has a relatively small thickness, a greater proportion of the heating material may be heatable by a given varying magnetic field, as compared to heating material in a component having a depth or thickness that is relatively large as compared to the other dimensions of the component. Thus, a more efficient use of material is achieved. In turn, costs are reduced.

In some embodiments, a component comprising the heating material may comprise discontinuities or holes therein. Such discontinuities or holes may act as thermal breaks to control the degree to which different regions of the smokable material 20 are heated in use. Areas of the heating material with discontinuities or holes therein may be heated to a lesser extent that areas without discontinuities or holes. This may help progressive heating of the smokable material 20, and thus progressive generation of vapor, to be achieved. Such discontinuities or holes may, on the other hand, be used to optimize the creation of complex eddy currents in use.

In each of the above described embodiments, the smokable material 20 comprises tobacco. However, in respective variations to each of these embodiments, the smokable material 20 may consist of tobacco, may consist substantially entirely of tobacco, may comprise tobacco and smokable material other than tobacco, may comprise smokable material other than tobacco, or may be free of tobacco. In some embodiments, the smokable material 20 may comprise a vapor or aerosol forming agent or a humectant, such as glycerol, propylene glycol, triacetin, or diethylene glycol.

An article embodying the present disclosure may be a cartridge, for example.

In each of the above described embodiments, the article 1, 2, 3 is a consumable article. Once all, or substantially all, of the volatilizable component(s) of the smokable material 20 in the article 1, 2, 3 has/have been spent, the user may remove the article 1, 2, 3 from the apparatus and dispose of the article 1, 2, 3. The user may subsequently re-use the apparatus with another of the articles 1, 2, 3. However, in other respective embodiments, the article 1, 2, 3 may be non-consumable, and the apparatus and the article 1, 2, 3 may be disposed of together once the volatilizable component(s) of the smokable material 20 has/have been spent.

In some embodiments, the apparatus discussed above is sold, supplied or otherwise provided separately from the articles 1, 2, 3 with which the apparatus is usable. However, in some embodiments, the apparatus and one or more of the articles 1, 2, 3 may be provided together as a system, such as a kit or an assembly, possibly with additional components, such as cleaning utensils.

The disclosure could be implemented in a system comprising any one of the articles discussed herein, and any one of the apparatuses discussed herein, wherein the apparatus itself has heating material, such as in a susceptor, for heating by penetration with the varying magnetic field generated by the magnetic field generator. Heat generated in the heating material of the apparatus could be transferred to the article to heat, or further heat, the smokable material 20 therein when the portion of the article is in the heating zone 111. In some such embodiments, the article may be free of heating material, so that the smokable material 20 of the article is heated only by the heat transferred to the article from the heating material of the apparatus.

In order to address various issues and advance the art, the entirety of this disclosure shows by way of illustration and example various embodiments in which the claimed invention may be practiced and which provide for superior articles for use with apparatus for heating smokable material to volatilize at least one component of the smokable material, and superior systems comprising such apparatus and such articles. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. An article for use with an apparatus for heating smokable material to volatilize at least one component of the smokable material, the article comprising:

- a malleable container defining a cavity, wherein the container comprises a vessel that defines the cavity and an opening into the cavity, and a seal sealing the opening;
- a mass of smokable material in the cavity; and
- heating material that is heatable by penetration with a varying magnetic field to heat the mass of smokable material,
- wherein the heating material is a plate, a strip, or a ribbon of heating material, and wherein the heating material comprises a first portion and a second portion that is different from the first portion, wherein both the first portion and the second portion are susceptible to eddy currents being induced in the heating material and the first portion of the heating material of the article is more susceptible to eddy currents being induced therein by penetration with a varying magnetic field than the second portion of the heating material of the article, wherein the first portion is made of a first material, the second portion is made of a second material, and the first material is of a higher susceptibility to eddy currents being induced therein than the second material, and wherein the first portion has a different thickness than the second portion; and
- wherein the heating material is in the cavity and within the mass of smokable material.

2. The article of claim 1, wherein the container comprises a sachet.

3. The article of claim 1, wherein the container defines an exterior of the article.

4. The article of claim 1, comprising a material that comprises a mixture of the smokable material and the heating material.

5. The article of claim 4, wherein the mixture comprises a mixture of the smokable material and elements, wherein each of the elements comprises the heating material that is heatable by penetration with a varying magnetic field.

6. The article of claim 1, wherein the container comprises a closed circuit of the heating material that is heatable by penetration with a varying magnetic field.

7. The article of claim 1, wherein the container comprises a mesh that comprises the heating material.

8. The article of claim 1, wherein the heating material is in contact with the mass of smokable material.

9. The article of claim 1, wherein the heating material comprises one or more materials selected from the group consisting of: an electrically-conductive material, a magnetic material, and a magnetic electrically-conductive material.

10. The article of claim 1, wherein the heating material comprises a metal or a metal alloy.

11. The article of claim 1, wherein the heating material comprises one or more materials selected from the group consisting of: aluminum, gold, iron, nickel, cobalt, conductive carbon, graphite, plain-carbon steel, stainless steel, ferritic stainless steel, copper, and bronze.

12. The article of claim 1, wherein the smokable material comprises at least one of tobacco or one or more humectants.

13. The article of claim 1, wherein at least a portion of the container is porous for permitting volatilized material generated by heating the smokable material within the cavity to leave the cavity.

14. A system, comprising:

- an apparatus for heating smokable material to volatilize at least one component of the smokable material; and
- an article for use with the apparatus, the article comprising a container defining a cavity, a mass of smokable material in the cavity and heating material in the cavity and within the mass of smokable material, wherein the container comprises a vessel that defines the cavity and an opening into the cavity, and a seal sealing the opening;
- wherein the apparatus comprises a heating zone for receiving at least a portion of the article, and a magnetic field generator for generating a varying magnetic field to be used in heating the mass of smokable material when the portion of the article is in the heating zone;
- wherein the container is malleable, and wherein the heating material is a plate, a strip or a ribbon of the heating material; and
- wherein the heating material comprises a first portion and a second portion that is different from the first portion, wherein both the first portion and the second portion are susceptible to eddy currents being induced in the heating material and wherein the first portion of the heating material of the article is more susceptible to eddy currents being induced therein by penetration with a varying magnetic field than the second portion of the heating material of the article, and wherein the first portion is made of a first material, the second portion is made of a second material, and the first material is of a higher susceptibility to eddy currents being induced therein than the second material, and wherein the first portion has a different thickness than the second portion.

* * * * *